United States Patent [19]

Mizuno et al.

[11] Patent Number: 4,894,989
[45] Date of Patent: Jan. 23, 1990

[54] HEATER FOR A STIRLING ENGINE

[75] Inventors: Tomokimi Mizuno, Chiryu; Tetsumi Watanabe, Osazaki; Nobuhiro Tanatsugu; Ryojiro Akiba, both of Tokyo, Japan

[73] Assignee: Aisin Seiki Kabushiki Kaisha, Kariya, Japan

[21] Appl. No.: 364,556

[22] Filed: Jun. 8, 1989

Related U.S. Application Data

[63] Continuation of Ser. No. 90,512, Aug. 28, 1987.

[30] Foreign Application Priority Data

Aug. 29, 1986 [JP] Japan .................................. 61-204321

[51] Int. Cl.$^4$ .............................................. F02G 1/04
[52] U.S. Cl. ........................................ 60/517; 60/524; 60/641.14; 60/676
[58] Field of Search ...................... 60/517, 524, 641.8, 60/641.14, 676

[56] References Cited

U.S. PATENT DOCUMENTS

| | | | |
|---|---|---|---|
| 3,029,596 | 4/1972 | Hanold et al. | 60/524 |
| 3,080,706 | 3/1963 | Flynn, Jr. | 60/659 |
| 4,126,995 | 11/1978 | Asselman et al. | 60/524 |
| 4,345,645 | 8/1982 | Bratt | 60/524 X |
| 4,512,388 | 4/1985 | Claar et al. | 165/10 A |
| 4,715,183 | 12/1987 | Meijer et al. | 60/524 |

FOREIGN PATENT DOCUMENTS 0178545  8/1986  Japan .................................. 60/524

Primary Examiner—Allen M. Ostrager
Attorney, Agent, or Firm—Burns, Doane, Swecker & Mathis

[57] ABSTRACT

A heater for use with a Stirling engine and a method for heating a working fluid for a Stirling engine is disclosed. The heater has a burner, heater tubes disposed in the burner, a space formed around the heater tubes which is filled with heat-storing material, and a high-temperature heat source. The heat-storing material is sealed by a seal member. Heat produced by the high-temperature heat source is supplied to the heater tubes via the heat-storing material; hence the heat-storing material acts as a secondary heat source. Heat is stored in the heat-storing material in the form of sensible heat or latent heat, or a chemical reaction is employed.

16 Claims, 1 Drawing Sheet

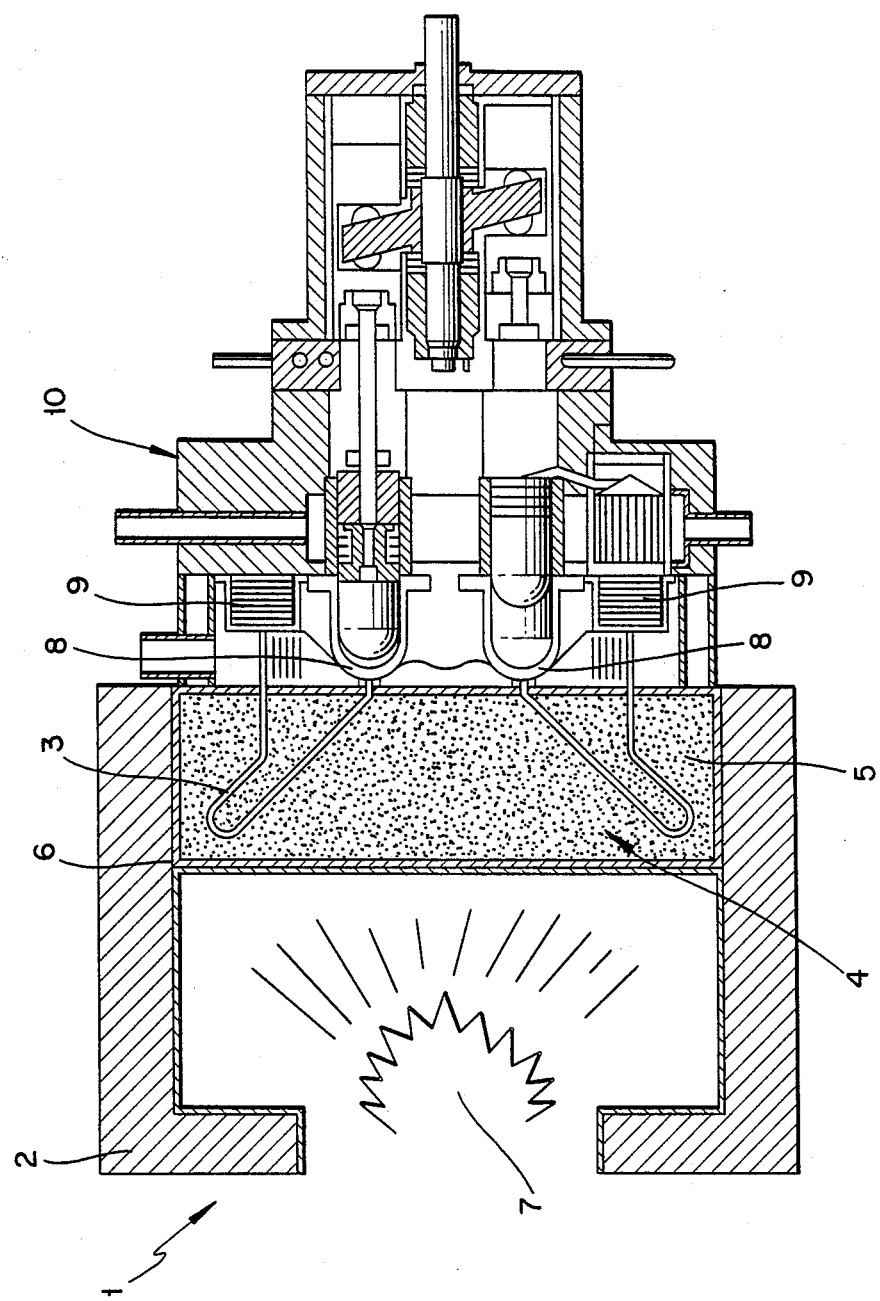

HEATER FOR A STIRLING ENGINE

This application is a continuation, of application Ser. No. 07/090,512 filed Aug. 28, 1987 now abandoned.

FIELD OF THE INVENTION

The present invention relates to a heater which is used as a secondary heat source for heating a Stirling engine.

BACKGROUND OF THE INVENTION

A prior art technique of this kind is disclosed in Japanese Patent Laid-Open No. 93,939/1980 entitled "Heat Exchanger in External Combustion Engine." In this prior art technique, heater tubes for a Stirling engine are disposed inside the heating chamber of a heater. The space in which the heater tubes are located is filled with inert gas. The heater tubes are heated by a high-temperature heat source located outside the heating chamber via the inert gas. This technique is intended for homogeneous distribution within the heater tubes and also for protection of the tubes against heat.

This prior art technique has certain problems. For example, when the amount of heat supplied from the high-temperature heat source varies, the amount of heat supplied from the heater head of the Stirling engine and used in operating the cycle changes. This heat change varies the shaft horsepower of the engine, and, as a result, a stable output cannot be obtained.

SUMMARY OF THE INVENTION

Accordingly, it is an object of the present invention to provide a heater which permits a Stirling engine to deliver output in a stable manner even if the amount of heat supplied from the high-temperature heat source varies.

The above object and others are achieved by a heater comprising a burner, heater tubes disposed in the burner, a high-temperature heat source for heating the heater tubes, and a space formed around the heater tubes and filled with heat-storing material which is sealed by a seal member and through which heat produced by the high-temperature heat source is supplied to the heater tubes. The heat-storing material acts as a secondary heat source for supplying the stored heat to the heater tubes.

The above object is also achieved by a method for heating a working fluid in a Stirling engine comprising providing a high-temperature heat source having a variable output including a low output range and a high output range, transferring heat to the working fluid from the heat source through a heat-storing material, storing heat from the heat source when said source is in the material, and maintaining the heat transfer to the working fluid at a substantially steady rate through transfer of the stored heat when the heat source is in the low output range.

When the amount of heat supplied from the primary heat source, i.e., the high-temperature heat source of the aforementioned heater, is large, heat is stored in the sealed heat-storing material. At the same time, heat is supplied to the heater tubes of the Stirling engine through the heat-storing material. When the amount of heat supplied from the high-temperature heat source is small or zero, the heat stored in the secondary heat source, i.e., the heat-storing material, is supplied to the heater tubes of the Stirling engine. Therefore, if the amount of heat supplied from the primary heat source, i.e., the high-temperature heat source, varies, the amount of heat supplied to the heater tubes and then to the cycle does not vary. This relatively constant supply of heat makes the shaft horsepower of the engine stable. In this way, the novel heater is free from the foregoing problem with the prior art technique.

BRIEF DESCRIPTION OF THE DRAWING

The single FIGURE is a cross-sectional view of a heater according to the invention, the heater being used for a Stirling engine.

DETAILED DESCRIPTION OF THE PREFERRED EMBODIMENTS

Referring to the FIGURE, a Stirling engine 10 has a heater 1 according to the invention mounted thereon. The heater 1 comprises a burner or burner housing 2, heater tubes 3 disposed in the burner housing 2, heat-storing material 5 that fills a space 4 formed around the heater tubes 3, a seal member 6 for sealing the heat-storing material 5, and a high-temperature heat source 7. The heater tubes 3 transfer a working fluid of the engine and connect expansion spaces 8 with heat accumulators 9, respectively. Heat produced by the heat source 7 is supplied to the heater tubes 3 through the heat-storing material 5. In addition, heat stored in the heat-storing material 5 can be furnished to the heater tubes 3 and, therefore, the heat-storing material 5 acts as a secondary heat source.

The heat-storing material 5 can make use of sensible heat, latent heat, or a chemical reaction to store heat. When sensible heat is employed, Na, NaK, or LiF is used. When latent heat (i.e., heat of fusion) is utilized, $Li_2CO_3$, NaCl, or $MgCl_2$ is used. When a chemical reaction is employed, any of the following chemical reactions can be used:

$Li_2CO_3 \rightleftharpoons Li_2O + CO_2 + 53.4$ Kcal/mol
$SrCO_3 \rightleftharpoons SrO + CO_2 + 56.5$ Kcal/mol
$CaCO_3 \rightleftharpoons CaO + CO_2 + 42.6$ Kcal/mol It is also possible to combine two or more sensible heat materials, or two or more latent heat materials. Two or more chemical reaction materials can also be combined, but generally it is not feasible to combine different types of materials (e.g., a chemical reaction material with a sensible heat material or a latent heat material).

Generally, the Stirling engine is operated at a temperature of from about 700° C. to about 900° C. A sensible heat material is generally kept at subatmospheric pressures, while latent heat materials and chemical reaction materials are utilized under substantially atmospheric pressure.

In the heater 1, the heat-storing material 5 is sealed in the burner or burner housing 2. When the amount of heat supplied to the heater 1 from the high-temperature heat source 7 is large, that is the heat source has a high output, heat is stored in the inserted heat-storing material 5. When the amount of heat supplied from the high-temperature source 7 is small or zero, heat is supplied to the heater tubes 3 of the Stirling engine 10 from the heat-storing material 5 acting as a secondary heat source. Therefore, if the amount of heat supplied from the high-temperature heat source 7 varies, the quantity of heat supplied from the heater tubes 3 to the cycle will not vary. Consequently, the shaft horsepower of the engine is stable.

As described above, the use of the novel heater makes the temperature distribution uniform within the heater tubes of the heater head, and protects the tubes against excessive heat. Also, even if the amount of heat supplied from the high-temperature heat source varies, a stable shaft horsepower is obtained. Since the layer for storing heat is formed around the heater head, the changes in the temperature of the heater tubes are minute irrespective of the changes in the amount of heat applied. This eliminates the problem of thermal fatigue.

As an example, the engine is used as an engine for a generator that employs solar heat as its heat source. The engine is installed in an artificial satellite which makes one revolution around the earth in 90 minutes. In this case, when the prior art techniques are used, heating of 45 minutes alternates with non-heating of 45 minutes. In the present invention, during heating, heat is stored simultaneously with the operation of the engine and s the engine is continuously run for 90 minutes per period. Therefore, the engine can be run continuously. Hence, the novel engine generates twice as much electric power as the power generated by the existing engine of the same size. In addition, causes of troubles are avoided, because it is not necessary to repeatedly start and stop the engine.

What is claimed is:

1. A heater for a Stirling engine, comprising:
   a burner;
   heater tubes disposed in the burner;
   a primary high-temperature heat source providing a variable amount of heat for heating the heater tubes; and
   a space formed around the heater tubes in the burner and filled with heat-storing material, the heat storing material being in direct contact with the heater tubes and the space being separated from said primary heat source by a seal member, heat produced by the primary heat source being supplied to the heater tubes solely through the heat-storing material, the heat-storing material acting as a secondary heat source for supplying stored heat by phase change or chemical reaction to the heater tubes, wherein the heat-storing material is substantially free of sensible heat-storing material.

2. A heater for a Stirling engine as set forth in claim 1, wherein said heat-storing material stores heat in the form of latent heat.

3. A heater for a Stirling engine as set forth in claim 2, wherein said heat-storing material comprises $Li_2CO_3$, NaCl or $MgCl_2$.

4. A heater for a Stirling engine as set forth in claim 1, wherein said heat-storing material stores heat by use of a chemical reaction.

5. A heater for a Stirling engine as set forth in claim 4, wherein said heat-storing material comprises $Li_2CO_3$, $SrCO_3$ or $CaCO_3$.

6. A heater for a Stirling engine as set forth in claim 1, wherein said Stirling engine is operated at a temperature of from about 700° C. to about 900° C.

7. A method for heating a working fluid in a Stirling engine, comprising:
   providing a high-temperature heat source having a variable output including a low output range and a high output range;
   transferring heat to the working fluid from the heat source solely through a heat-storing material, the working fluid being contained in heater tubes and the heat-storing material directly contacting the heater tubes and being contained in a space surrounding the heater tubes;
   storing heat from said heat source when said source is in said high output range in the heat-storing material; and
   maintaining said heat transfer to said working fluid at a substantially steady rate through transfer by phase change or chemical reaction of said stored heat when said heat source is in said low output range;
   wherein the heat-storing material is substantially free of sensible heat-storing material; and
   wherein said heat transferring step includes transferring heat from the high-temperature heat source to the heat-storing material via a seal member separating the high temperature heat source from the space containing the heat-storing material.

8. A method for heating a Stirling engine as set forth in claim 7, wherein said heat-storing material stores heat in the form of latent heat.

9. A method for heating a Stirling engine as set forth in claim 8, wherein said heat-storing material comprises $Li_2CO_3$, NaCl or $MgCl_2$.

10. A method for heating a Stirling engine as set forth in claim 7, wherein said heat-storing material stores heat by use of a chemical reaction.

11. A method for heating a Stirling engine as set forth in claim 10, wherein said heat-storing material comprises $Li_2CO_3$, $SrCO_3$ or $CaCO_3$.

12. A method for heating a Stirling engine as set forth in claim 11, wherein said Stirling engine is operated at a temperature of from about 700° C. to about 900° C.

13. A heater for a Stirling engine, comprising:
    a burner housing;
    heater tubes disposed in the burner housing;
    a primary high-temperature heat source providing a variable amount of heat for supplying heat to the heater tubes in the burner housing; and
    a heat-storing material directly contacting the heater tubes and contained in a space surrounding the heater tubes, said heat storing material being sealed from said heat source via a seal member disposed between the heat source and the space containing the heat-storing material, heat produced by the high-temperature heat source being supplied to the heater tubes solely through the heat-storing material, the heat-storing material acting as a secondary heat source for supplying stored heat by phase change or chemical reaction to the heater tubes; wherein the heat-storing material is substantially free of sensible heat-storing material.

14. A heater for a Stirling engine as set forth in claim 13, wherein said heat source has a high heat output and a low heat output.

15. A heater for a Stirling engine, comprising:
    a burner;
    heater tubes disposed in the burner;
    a primary high-temperature heat source for heating the heater tubes wherein said heat source is intermittent solar heat, and a secondary heat source for heating the heater tubes, wherein said secondary heat source is heat-storing material which directly contacts the heater tubes; and
    a space formed around the heater tubes in the burner and filled with said heat-storing material, said heat-storing material being sealed from said solar heat source by a seal member, and wherein the heat produced by said solar heat source is supplied to the heater tubes by phase change or chemical reaction solely through said heat-storing material;
wherein the heat-storing material is substantially free of sensible heat-storing material.

16. An artificial satellite including a Stirling engine and a heater for said Stirling engine as claimed in claim 15.

* * * * *